United States Patent
Behner et al.

(10) Patent No.: US 8,056,816 B2
(45) Date of Patent: *Nov. 15, 2011

(54) REAL TIME CARD PRINTING SYSTEMS AND METHODS

(75) Inventors: Mark R. Behner, Littleton, CO (US); Ronald J. Zanotti, Englewood, CO (US)

(73) Assignee: DataCard Corporation, Minnetonka, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 12/840,001

(22) Filed: Jul. 20, 2010

(65) Prior Publication Data

US 2011/0000386 A1    Jan. 6, 2011

Related U.S. Application Data

(63) Continuation of application No. 11/832,481, filed on Aug. 1, 2007, now Pat. No. 7,806,338.

(51) Int. Cl.
*G06K 19/02* (2006.01)
*G06Q 40/00* (2006.01)

(52) U.S. Cl. ........................ 235/488; 235/493

(58) Field of Classification Search ........... 235/487–495
See application file for complete search history.

(56) References Cited

U.S. PATENT DOCUMENTS

| | | | |
|---|---|---|---|
| 5,746,451 A | 5/1998 | Weyer | |
| 5,863,076 A * | 1/1999 | Warther | 283/74 |
| 5,889,941 A | 3/1999 | Tushie et al. | |
| 6,014,748 A | 1/2000 | Tushie et al. | |
| 6,196,459 B1 | 3/2001 | Goman et al. | |
| 7,404,516 B2 * | 7/2008 | McGee et al. | 235/380 |
| 2002/0138438 A1 | 9/2002 | Bardwell | |
| 2003/0006901 A1 | 1/2003 | Kim et al. | |
| 2004/0099730 A1 * | 5/2004 | Tuchler et al. | 235/380 |
| 2004/0188023 A1 | 9/2004 | Sasaki et al. | |
| 2005/0167487 A1 | 8/2005 | Conlon et al. | |
| 2005/0173520 A1 | 8/2005 | Jaros et al. | |
| 2006/0190332 A1 | 8/2006 | Grider | |
| 2006/0259189 A1 * | 11/2006 | Perlow et al. | 700/231 |
| 2007/0215699 A1 | 9/2007 | Arego et al. | |

FOREIGN PATENT DOCUMENTS

| | | |
|---|---|---|
| WO | 2005/024699 | 3/2005 |
| WO | 2006/018636 | 2/2006 |

* cited by examiner

*Primary Examiner* — Steve S Paik
*Assistant Examiner* — Christle Marshall
(74) *Attorney, Agent, or Firm* — Hamre, Schumann, Mueller & Larson, P.C.

(57) ABSTRACT

A method for personalizing a presentation instrument for an account holder while the account holder is present is described. The method includes transmitting to a server computer a request to personalize a presentation instrument for an account holder who has a financial account with a financial institution. The request includes the account holder's name and background information indicating a background to be placed onto the presentation instrument. The method further includes receiving, at the server computer from the financial institution, presentation instrument data to be included on the presentation instrument. The presentation instrument data comprises an account number and an expiration date. Further, the method includes transmitting from the server computer through a financial institution network, personalization information usable by a printer to place printed personalization information onto a blank presentation instrument, and to electronically store account information onto the blank presentation instrument while the account holder is present.

25 Claims, 5 Drawing Sheets

REAL TIME CARD PRINTING SYSTEMS AND METHODS

CROSS REFERENCE TO RELATED APPLICATIONS

The present application is a Continuation Application of U.S. patent application Ser. No. 11/832,481, entitled "REAL TIME CARD PRINTING SYSTEMS AND METHODS" filed Aug. 1, 2007, the entire disclosure of which is incorporated herein by reference.

BACKGROUND OF THE INVENTION

This invention relates generally to issuance of presentation instruments. More specifically the invention relates to instant issuance of customizable presentation instruments from a financial institution.

Presently, instantly issued presentation instruments are created on pre-designed card stock. For example, a customer can choose between an number of background designs and styles; however, the variety of designs and styles are limited to the inventory stocked at a branch location. In other words, various pre-designed cards must be securely stored at the branch location and the customer is limited to selecting a card based on the available designs.

There are at least two problems with using such pre-designed cards. First, because of the limited number of designs, the customer does not have the freedom and flexibility to choose a more personalized design. Many customers would like to be able to choose their own background, color, etc., as opposed to being constrained to the cards stocked at the branch office.

Secondly, the different pre-designed cards must be securely stored in a vault. As such, unpopular designs must be destroyed if they are not used. The destruction of the cards needs to be accounted for and tracked. This causes extra work for branch office employees, added waste, and can introduce inaccuracies in the reporting of card inventory. Accordingly, the methods and systems of the present invention provide solutions to these and other problems.

BRIEF SUMMARY OF THE INVENTION

In one embodiment, a method for personalizing a presentation instrument for an account holder while the account holder is present is described. The method includes transmitting to a server computer a request to personalize a presentation instrument for an account holder who has a financial account with a financial institution. The request includes the account holder's name and background information indicating a background to be placed onto the presentation instrument. The method further includes receiving, at the server computer from the financial institution, presentation instrument data to be included on the presentation instrument. The presentation instrument data comprises an account number and an expiration date. Further, the method includes transmitting from the server computer through a financial institution network, personalization information usable by a printer to place printed personalization information onto a blank presentation instrument, and to electronically store account information onto the blank presentation instrument while the account holder is present.

In a further embodiment, a system for personalizing a presentation instrument for an account holder while the account holder is present is described. The system comprises a client computer which is configured to receive input from an account holder. The input includes the account holder's name and a background image. The system further includes a server computer coupled to the client computer which is configured to receive the input from the client computer. The server computer is further configured to process the input, and to transmit a request for an account number and an expiration date to a financial institution server based on the input. Further, the server is configured to receive the account number and the expiration date from a financial institution card management server to calculate personalization information, and to transmit the personalization information to a printer to be printed on a stock presentation instrument while the account holder is present.

In yet a further embodiment, an instant issue customizable presentation instrument for presenting to an account holder while the account holder is present is described. The presentation instrument comprises a presentation instrument body, and a magnetic stripe on the presentation instrument body which is configured to store account information associated with the presentation instrument. The presentation instrument further comprises a printable film material which is configured to receive printing of a customized background image, an account number, and an expiration date. The background image is selected from a plurality of pre-approved images, and the film material is configured to be adhered to the presentation instrument body. Furthermore, the presentation instrument comprises an inhibitor which is placed onto the printable film material at a location that will be placed over the magnetic stripe. The inhibitor is configured to inhibit the printable film material from fusing to the magnetic stripe.

BRIEF DESCRIPTION OF THE DRAWINGS

The present invention is described in conjunction with the appended figures.

Figure 1:
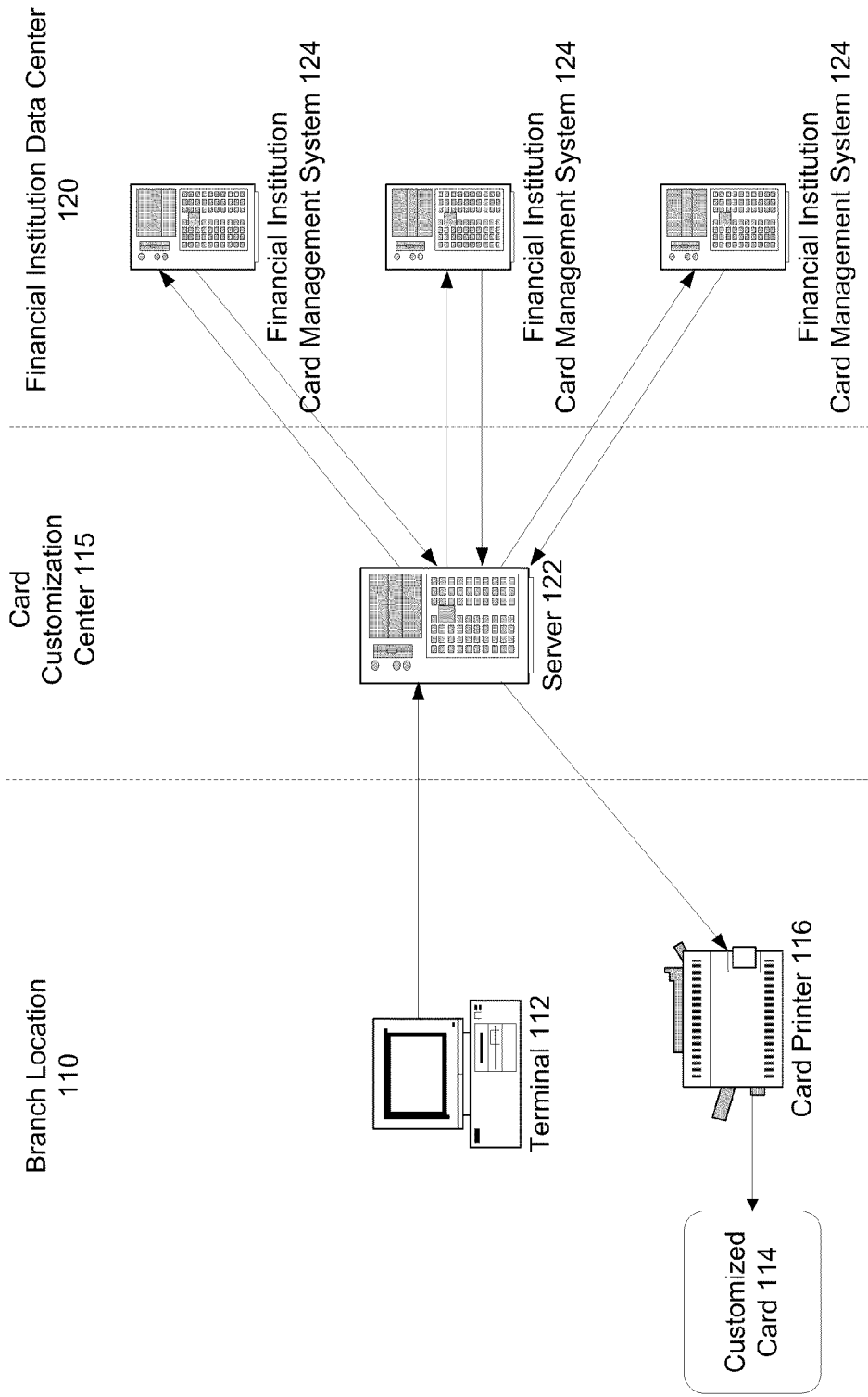
FIG. 1 is a block diagram illustrating one embodiment of the present invention.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination corresponds to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. In addition, a processor(s) may perform the necessary tasks.

One aspect of the invention enables an account holder to receive a customized presentation instrument from a financial institution while the account holder is present. The account holder may be initializing a new account, or may already have an existing account. The presentation instrument may be customized with a variety of background images. The images may be chosen from an image database, or may be a personal image provided by the account holder.

The presentation instrument may be printed while the account holder is at, for example, a bank branch location. The account holder enters his/her identification information and background selection into a terminal provided at the branch location. The information is processed and transmitted to a card printer where the account holder receives his/her new customized presentation instrument.

Turning now to FIG. 1, which illustrates a block diagram of a system for issuing a customized presentation instrument while an account holder is present. FIG. 1 may be divided into three locations (i.e. branch location 110, card customization center 115 and financial institution data center 120). The locations are for representative purposes only, and may be physically located together and/or remotely located from each other. Furthermore, there may be more or less than the three representative locations. For example, server 122 and financial institution card management system (FICMS) 124 may be at the same location.

Branch location 110 may include terminal 112. In one embodiment, terminal 112 may be a CardWizard® terminal. Terminal 112 may display a user interface (IU) that prompts the account holder to select information that will be placed on the presentation instrument. The information may include the account holder's name and account information (e.g. account number) and the image for the presentation instrument background. The account holder's name entered in the IU may be the name that appears on the presentation instrument. The background image may be selected from a database of approved background images. Images used as a background on a presentation instrument may be required to be approved by the issuing financial institution or an association (e.g. VISA®, MasterCard®, etc.).

In one embodiment, the account holder is able to upload a personal image at terminal 112. The image may be uploaded in a variety of ways (e.g. flash memory, CD ROM, DVD ROM, floppy disk, secure digital (SD) memory, network connection, etc.). The personal image may be required to be approved by the financial institution and/or a bank representative. The personal image may be scenery, a family member's picture, favorite sports team logo, etc.

Once the information from the card holder is input into terminal 112, the information is transmitted to server 122. The information may be transmitted over the bank network of the branch location, or over some other network. The network may be a local area network (LAN), a wide area network (WAN), the Internet, etc. Server 122 processes the received information. In one embodiment, server 122 may be a CardWizard® server. The processing may include checking the received information for mistakes and inaccuracies. The processing may also include checking the account holder's name and account information against a database to verify the existence of the account. Once server 122 completes processing the received information, server 122 transmits the process information to FICMS 124.

FICMS 124 generates a personal account number (PAN) and an expiration date of the presentation instrument. FICMS 124 may also determine whether a personal image provided by the account holder is approved by the financial institution. FICMS 124 then transmits the PAN and the expiration date back to server 122.

Based on the received PAN and expiration date, server 122 calculates card verification value (CVV), card verification value 2 (CVV2), and a personal identification number (PIN) offset value. The CVV and the PIN offset value may be encoded, for example, on magnetic stripe 330 in FIG. 4B. CVV2 may be, for example, CVV2 440 in FIG. 4B. CVV, the PIN offset value and CVV2 may be used to verify the authenticity of the presentation instrument. Specifically, CVV2 may be used by merchants to verify presentation instrument authenticity when the merchant does not have physical access to the presentation instrument (e.g. a purchase made over a telephone, a mail catalog order, the Internet, etc.).

Server 122 transmits the customer name, the background image, CVV, CVV2, the PIN offset value, the PAN and the expiration date to card printer 116. In one embodiment, card printer 116 may be a high definition presentation instrument printer/encoder. One aspect of high definition printing is that the print head does not come in contact with the surface of the card. Instead, printer 116 prints onto a printable film which is then fused flush with the card through heat and pressure. A further aspect of high definition printing is that printing and encoding is completed in a single pass. This reduces the risk of incorrect and/or improper encoding and printing.

Card printer 116 may include a dual card hopper which allows for multiple types of cards to be loaded into the printer. Card printer 116 may also include a display screen. The display screen may be a liquid crystal display (LCD); however, other display types may be used. Further, the display screen may display card supply information, option settings, progress information, etc. for a current print job. Card printer 116 may also include a lamination module which provides a laminate protection on the card to protect the card from wear and tear from daily use.

Card printer 116 may be loaded with blank presentation instrument card stock. The blank cards may include the financial institution's logo and/or holograph (e.g. logo 435, logo 455, etc.). The blank cards may include a magnetic stripe (e.g. magnetic stripe 330), a financial institution logo (e.g. logo 435) and a signature box (e.g. signature box 445). The magnetic stripe may be used to encode the CVV and PIN offset.

Furthermore, the blank cards may be a variety of colors (typically white). The blank cards may also be from generic card stock. In one embodiment, the blank cards are standard CR80 sized cards. Nonetheless, other larger or smaller sized cards may be used. In an alternate embodiment, the blank cards may be "rack cards" which include multiple cards on a single sheet. The cards can be removed by punching out the perforation around each card. In a another embodiment, the blank cards may be made of a plastic material. However, multiple varieties of plastic and/or other materials may be used.

Such generic or blank cards would provide more security and better tracking of card inventory. For example, branch location 110 will only need to keep track of one type of card. Furthermore, if any of the generic blank cards are lost or stolen, it would be more difficult for the cards to be used fraudulently. This is due to the fact that the cards do not have a background image nor do they have embossed numbering. In addition, waste would be avoided since all of a branch location's cards are generic there would not be any "less popular" cards, which would require shredding.

In a further embodiment, the blank cards may be covered with a printable film. Card printer 116 may use reverse film transfer to print the selected background, PAN, expiration date, the CVV2 (e.g. CVV2 440) and customer name (e.g. customer name 425) on a printable film covering the blank card. Furthermore, a name/logo (e.g. name/logo 410) and instructions (e.g. instructions 455) may be printed on the printable film in order to personalize the card. Card printer 116 may also encode account information on the presentation instrument. For example, the CVV and pin offset value may be encoded on the magnetic stripe of the presentation instrument.

The printable film may cause functionality problems if it covers the magnetic stripe and/or the signature box. As such, in order to address this problem an inhibitor (e.g. inhibitor 340) may be placed over the magnetic stripe and/or the signature box. The inhibitor will be described below in more detail with respect to FIG. 3.

The output from card printer 116 may be customized card 114. Customized card 114 may be instantly accessed by the customer. This enables the customer to leave the branch location with the customized card, as opposed to waiting to receive the card in the mail, or returning to the branch location at a future date.

Figure 2:
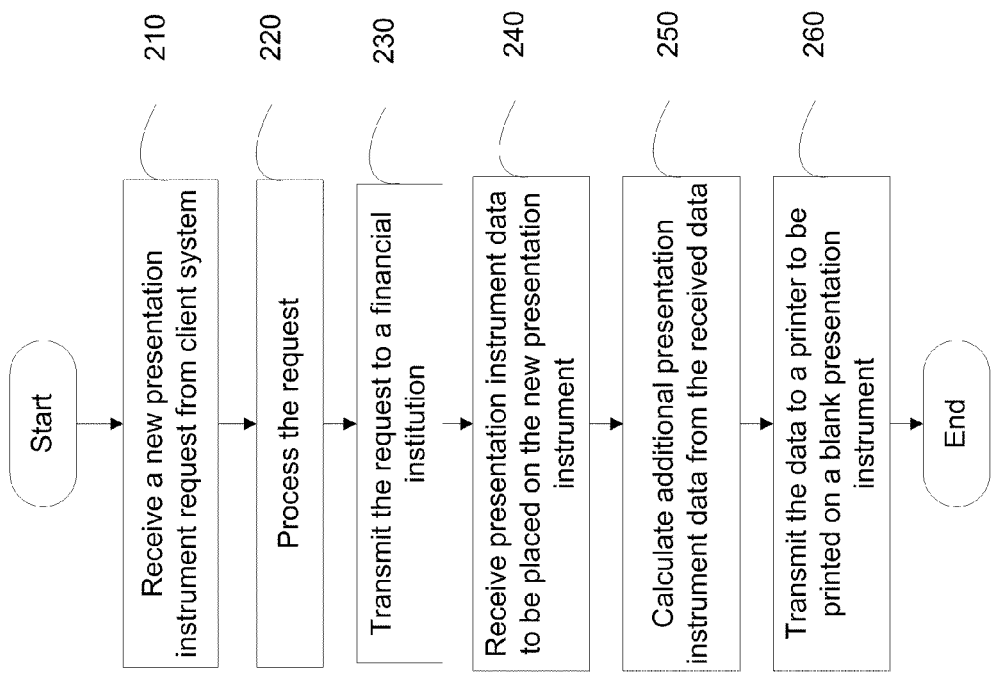
FIG. 2 is a flow diagram illustrating one embodiment of the present invention.

Turning now to FIG. 2, which illustrates a flow diagram for instantly issuing a customized presentation instrument according to one embodiment of the invention. The steps in the flow diagram may represent functionality of server 122; however, the steps may also be performed by other apparatuses and/or devices. The customized presentation instrument may include a customized background image selected from a pre-approved set of images or may be a personal image provided by an account holder which has been approved by the financial institution.

At process block 210, server 122 receives a request for a new presentation instrument from a client system (e.g. terminal 112). The request may include the requesting account holder's name, account number and a selected background image for the presentation instrument. At process block 220, server 122 processes the request. Processing of the request may include verifying the accuracy of the information associated with the request. The processing may further include verifying that the selected background image has been approved by the issuing financial institution, and that the requesting customer is eligible for the requested presentation instrument.

At process block 230, server 122 transmits the request to the financial institution (e.g. Capitol One, Chase, etc.). The receiving system at the financial institution may be FICMS 124; however, other systems may be used. At process block 240, server 122 receives data from FICMS 124 to be included on the new presentation instrument. This data may include, among other things, a PAN and an expiration date. At process block 250, server 122 calculates additional data to be included on the new presentation instrument. This data may include the CVV, CVV2 and pin offset value. Nonetheless, server 122 may calculate other data used for a variety of presentation instrument types. Such presentation instrument types may include, for example, gift cards, identification cards, automatic teller (ATM) cards, credit cards, check cards, etc.

At process block 260, server 122 transmits all of the data associated with the new presentation instrument to a printer (e.g. card printer 116) to be printed on a blank presentation instrument. The account holder is then able to instantly receive a customized presentation instrument (e.g. customized card 114), and can immediately make purchases, access ATMs, etc.

Figure 3:
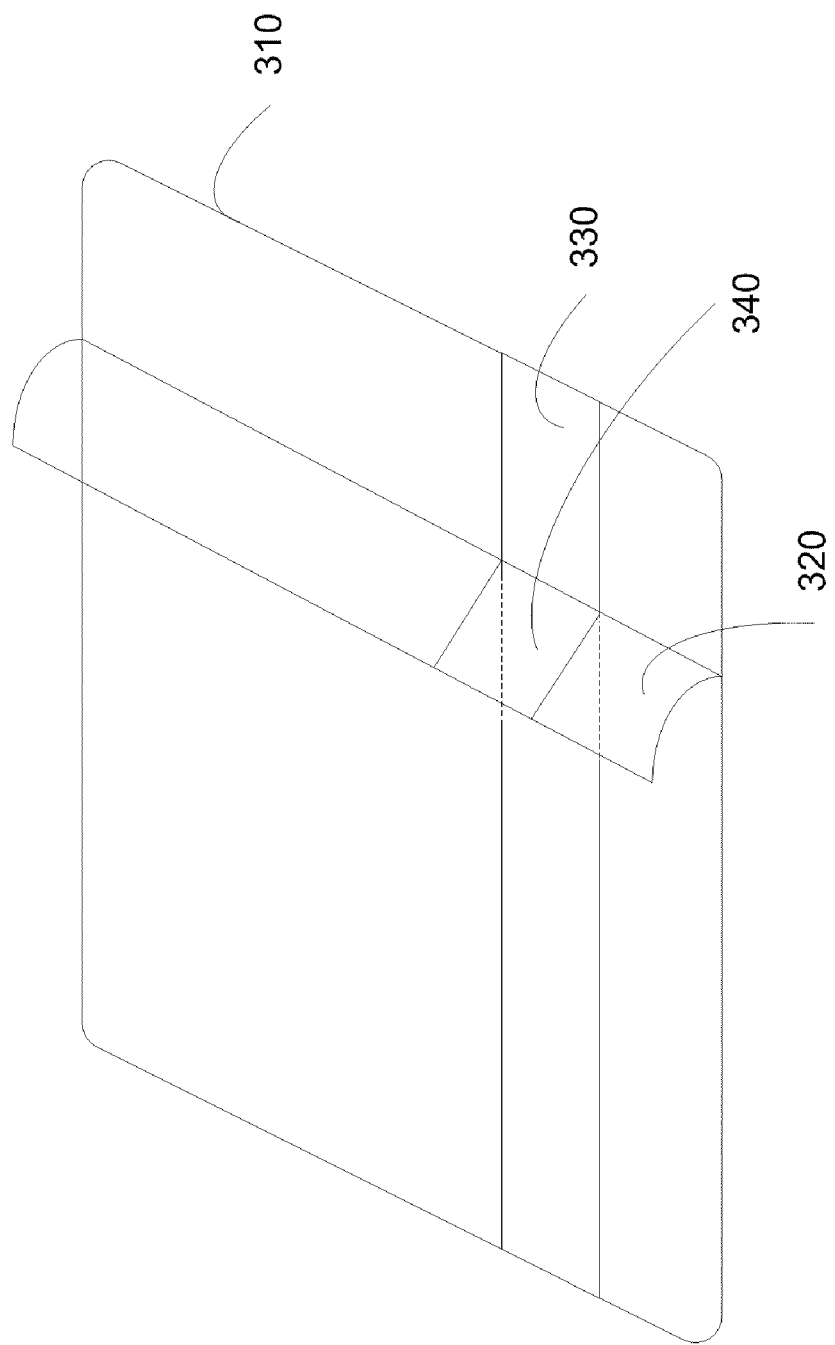
FIG. 3 is a block diagram illustrating a presentation instrument according to one embodiment of the present invention.

Referencing FIG. 3, which illustrates a presentation instrument covered with a printable film according to one embodiment of the invention. Often when covering a presentation instrument with the printable film there are locations on the presentation instrument that are adversely affected by such a film. Specifically, a magnetic stripe may not function properly if it is covered by the printable film. Similarly, if the presentation instrument includes a signature box, a radio frequency (RF) device, a smart device, a barcode, a proximity device, an optical memory device, etc, the printable film may interfere with functionality. Accordingly, any area of a blank presentation instrument that would be interfered with by the printable film may be covered with a material that inhibits the printable film from adhering to the blank presentation instrument (e.g. inhibitor 340).

Blank presentation instrument 310 may include printable film 320, magnetic stripe 330 and inhibitor 340. As discussed above, printable film 320 may interfere with the functionality of magnetic stripe 330. In one embodiment, inhibitor 340 is placed on printable film 320 to inhibit fusing of printable film 320 to blank presentation instrument 310. In an alternative embodiment, printable film 320 includes inhibitor 340 at the location of magnetic stripe 330. Nonetheless, when printable film 320 is fused to blank presentation instrument 310, inhibitor 340 allows for printable film 320 to not be fused to magnetic stripe 330. After printable film 320 with inhibitor 340 is fused to blank presentation instrument 310, printable film 320 with inhibitor 340 is then removed from presentation instrument 310, leaving magnetic stripe 330 uncovered.

In one embodiment, inhibitor 340 may be pealed off of presentation instrument 310, in the alternative, card printer 114 may include functionality to automatically remove inhibitor 340. Consequently, once inhibitor 340 is removed, magnetic stripe 330 is able to function properly and uninhibited by printable film 320.

In one embodiment, card printer 114 includes two print ribbons (e.g., a color and inhibitor ribbon and a printable film ribbon). The color and inhibitor ribbon may include three or four print color panels (e.g., yellow, cyan, magenta, and/or black) and an inhibitor panel (e.g., inhibitor 340). In one embodiment, the printable film ribbon may be clear. As a printing request is processed, each color panel is printed from the color ribbon to the printable ribbon. After all the colors have been printed on the printable ribbon, the inhibitor panel is printed on top of the colors in the area(s) which need inhibiting (e.g., the area at magnetic stripe 330) on the printable ribbon. Subsequently, colors are printed on the printable ribbon to create, for example, an image and the inhibitor is printed on top of the image to create inhibited areas.

Furthermore, the printable ribbon is fused on to a blank presentation instrument (e.g., presentation instrument 310), and because of the inhibitor being between the colors of the printable ribbon and the blank presentation instrument, the color underneath the inhibitor are not fused and/or transferred over to the blank presentation instrument. In addition, the inhibitor is also not fused and/or transferred to the blank presentation instrument.

Figure 4B:
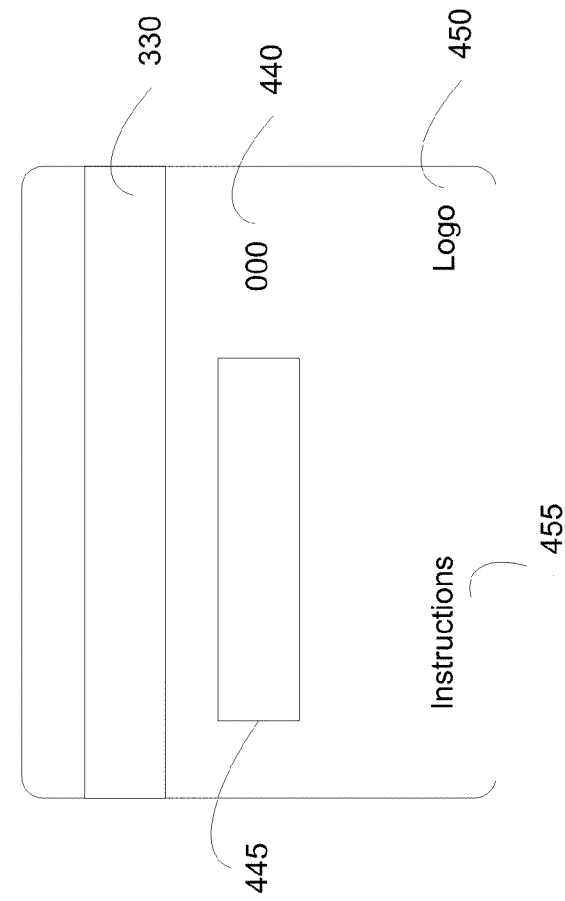
FIG. 4B is a block diagram illustrating a back view of a presentation instrument according to another embodiment of the present invention.
Figure 4A:
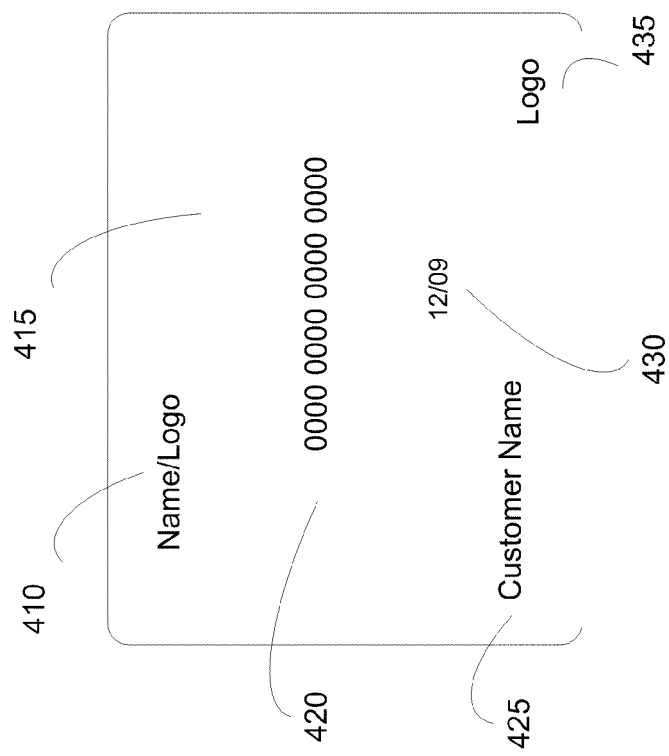
FIG. 4A is a block diagram illustrating a front view of a presentation instrument according to one embodiment of the present invention.

Turning now to FIGS. 4A and 4B which illustrate a front and back view of a presentation instrument according to one embodiment of the invention. FIG. 4A may include name/logo 410, background image 415, PAN 420, customer name 425, expiration date 430 and logo 435. Name/logo 410 may be the name and logo of the issuing bank for the credit card, or name/logo 410 may be the name and logo of the store for which the gift card is associated. Background image 415 may be the image selected by the presentation instrument's customer.

PAN 420 may be the account number associated with the presentation instrument. PAN 420 may be a bank account number, a credit card number, pre-paid store value card number, such as a gift card number, etc., which may be used to identify the account associated with the presentation instrument.

Customer name 425 may be the name of the customer associated with the presentation instrument account. Customer name 425 may be optional, for example, with a gift card in order to allow any holder of the gift card to use the gift card. Further, customer name 425 may be the name input into terminal 112.

Expiration date 430 may be used to indicate when the presentation instrument is no longer valid. Expiration date 430, like customer name 425, may be optional. Furthermore, expiration date 430 may be the expiration date received from FICMS 124. Logo 435 may be the logo of the financial institution that issued the presentation instrument. Logo 435 may also be a holograph associated with the financial institution.

Referring now to FIG. 4B which includes magnetic stripe 330, signature box 445, CVV2 440, logo 450 and instructions 455. Magnetic stripe 330, as discussed above, may be encoded with account information. Magnetic stripe 330 may also be replaced with a barcode, an RF transmitter, a smart device, proximity device, optical memory device, etc. Instructions 455 may include instructions on how to use the presentation instrument. Further, instructions 455 may provide contact information (e.g. telephone number, web address, mailing address, etc.).

Signature box 445 may be a writable section of the presentation instrument where the account holder can sign his or her name for identification purposes. It should be noted that any or all of the items included in FIGS. 4A and 4B are optional, and may be removed and/or rearranged according to embodiments of the invention.

Figure 5:
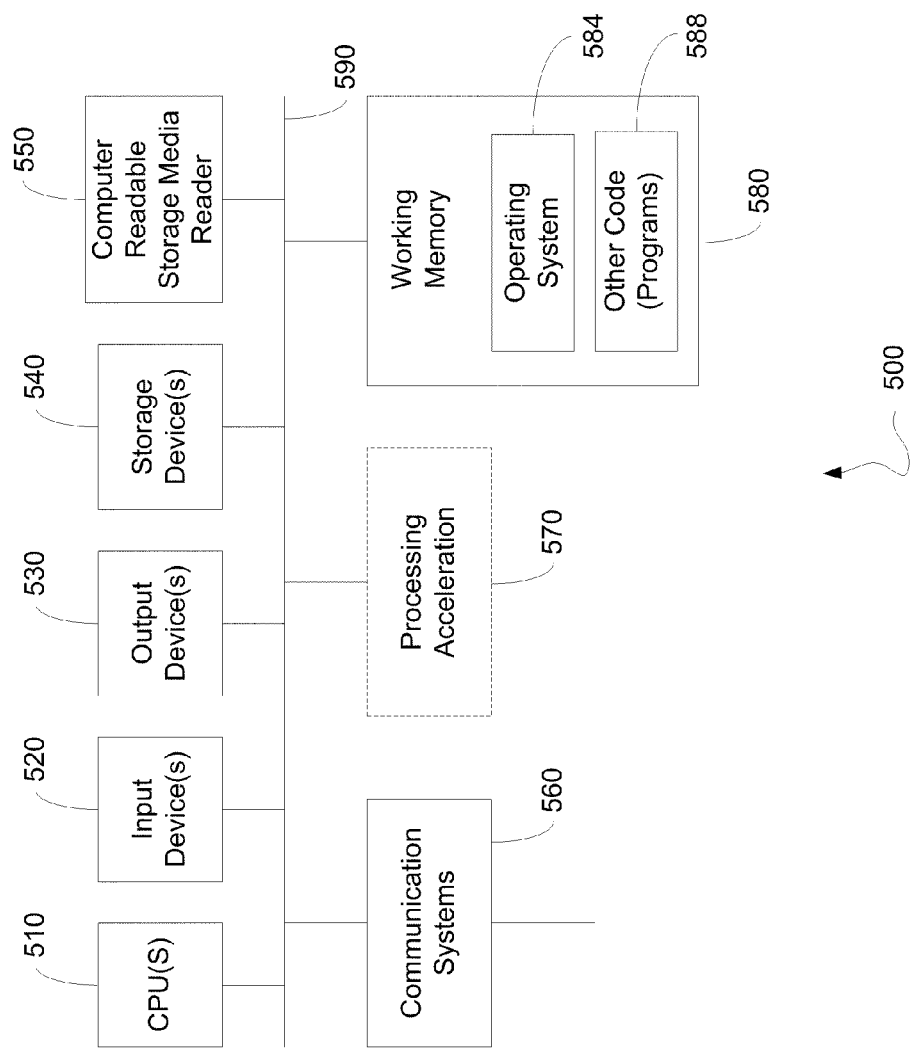
FIG. 5 is a block diagram illustrating an exemplary computer system used by embodiments of the present invention.

FIG. 5 is a block diagram illustrating an exemplary computer system 500 in which embodiments of the present invention may be implemented. This example illustrates a computer system 500 such as may be used, in whole, in part, or with various modifications, to provide the functions of terminal 112, server 122, financial institution card management system 124 and/or other components of the invention. For example, various functions of server 122 may be controlled by the computer system 500, including, merely by way of example, processing a request for a new presentation (process block 220), calculating additional presentation instrument data (process block 250), etc.

The computer system 500 is shown comprising hardware elements that may be electrically coupled via a bus 590. The hardware elements may include one or more central processing units 510, one or more input devices 520 (e.g., a mouse, a keyboard, etc.), and one or more output devices 530 (e.g., a display device, a printer, etc.). The computer system 500 may also include one or more storage device(s) 540. By way of example, storage device(s) 540 may be disk drives, optical storage devices, solid-state storage device such as a random access memory ("RAM") and/or a read-only memory ("ROM"), which can be programmable, flash-updateable, etc.

The computer system 500 may additionally include a computer-readable storage media reader 550, a communications system 560 (e.g., a modem, a network card (wireless or wired), an infra-red communication device, Bluetooth™ device, cellular communication device, etc.), and working memory 580, which may include RAM and ROM devices as described above. In some embodiments, the computer system 500 may also include a processing acceleration unit 570, which can include a digital signal processor, a special-purpose processor, etc.

The computer-readable storage media reader 550 can further be connected to a computer-readable storage medium, together (and, optionally, in combination with storage device (s) 540) comprehensively representing remote, local, fixed, and/or removable storage devices plus storage media for temporarily and/or more permanently containing computer-readable information. The communications system 560 may permit data to be exchanged with a network, system, computer and/or other component described above.

The computer system 500 may also comprise software elements, shown as being currently located within a working memory 580, including an operating system 584 and/or other code 588. It should be appreciated that alternate embodiments of a computer system 500 may have numerous variations from that described above. For example, customized hardware might also be used and/or particular elements might be implemented in hardware, software (including portable software, such as applets), or both. Furthermore, connection to other computing devices such as network input/output and data acquisition devices may also occur.

Software of computer system 500 may include code 588 for implementing any or all of the function of the various elements of the architecture as described herein. For example, software stored on and/or executed by a computer system such as system 500, can provide the functions of the server 122 and/or other components of the present invention. Methods may be implemented by software on some of these components which have been discussed above in more detail.

A number of variations and modifications of the invention can also be used within the scope of the invention. For example, various steps of the methods discussed herein can be conducted by multiple processors in different orders than shown in FIG. 2. The invention has now been described in detail for the purposes of clarity and understanding. However, it will be appreciated that certain changes and modifications may be practiced within the scope of the appended claims.

What is claimed is:

1. A method for personalizing a presentation instrument, the method comprising:
    receiving, by a server computer, a request to personalize a presentation instrument for an account holder who has a financial account with a financial institution, wherein the request includes at least one of the account holder's name and background information indicating a background to be placed onto the presentation instrument;
    receiving, by the server computer from the financial institution, presentation instrument data to be included on the presentation instrument, the presentation instrument data comprising an account number and an expiration date; and
    transmitting, from the server computer through a financial institution network, personalization information usable by a reverse film transfer printer to place printed personalization information onto a blank presentation instrument, to place an inhibitor onto a film material at a location on the film material that will be placed over a magnetic stripe on the blank presentation instrument, and to electronically store account information onto the magnetic stripe of the blank presentation instrument.

2. The method of claim 1, further comprising:
    printing at least one of the background, the account holder's name, the account number, and the expiration date on the film material; and
    fusing the film material to the blank presentation instrument.

3. The method of claim 2, further comprising removing the inhibitor from the presentation instrument.

4. The method of claim 1, wherein the reverse film transfer printer is approved by the financial institution for printing the presentation instrument.

5. The method of claim 1, wherein the presentation instrument is at least one of a credit card, a gift card, an automatic teller (ATM) card, and a check card.

6. The method of claim 1, further comprising calculating, at the server computer, at least one of a card verification value (CVV), a CVV2 and a personal identification number (PIN) offset value, based on presentation instrument data received from the financial institution.

7. The method of claim 1, wherein the background information is selected from a plurality of images pre-approved by the financial institution.

8. The method of claim 1, wherein the background information is a personal image file uploaded by the account holder.

9. The method of claim 8, wherein the account holder uploads the personal image file from at least one of a flash drive, a floppy drive, and a secure digital (SD) memory.

10. The method of claim 1, wherein the presentation instrument includes at least one of a radio frequency (RF) transmitter, a barcode, and a proximity device.

11. A customizable presentation instrument comprising:
    a presentation instrument body;
    a magnetic stripe on the presentation instrument body that is configured to store account information associated with the presentation instrument;
    a printable film material configured to receive printing of at least one of a background image, an account number, and an expiration date, wherein the film material is configured to be adhered to the presentation instrument body; and
    an inhibitor placed onto the printable film material at a location on the printable film material that will be placed over the magnetic stripe on the blank presentation instrument.

12. The presentation instrument of claim 11, wherein the inhibitor is configured to inhibit the printable film material from fusing to the magnetic stripe.

13. The presentation instrument of claim 11, further comprising a signature box on the presentation instrument body, wherein the inhibitor is placed onto the printable film material at a location on the printable film material that will be placed over the signature box on the blank presentation instrument, wherein the inhibitor is configured to inhibit the printable film material from fusing to the signature box.

14. A non-transitory computer-readable medium having sets of instructions stored thereon which, when executed by a computer, cause the computer to:
    receive, by a server computer, a request to personalize a presentation instrument for an account holder who has a financial account with a financial institution, wherein the request includes at least one of the account holder's name and background information indicating a background to be placed onto the presentation instrument;
    receive, by the server computer from the financial institution, presentation instrument data to be included on the presentation instrument, the presentation instrument data comprising an account number and an expiration date; and
    transmit, from the server computer through a financial institution network, personalization information usable by a reverse film transfer printer to place printed personalization information onto a blank presentation instrument, to place an inhibitor onto a film material at a location on the film material that will be placed over a magnetic stripe on the blank presentation instrument, and to electronically store account information onto the magnetic stripe of the blank presentation instrument.

15. A method for manufacturing a customizable presentation instrument, the method comprising:
    providing a blank presentation instrument body with a magnetic stripe;
    storing account information associated with the presentation instrument on the magnetic stripe;
    placing a printable film material on the presentation instrument body, wherein the film material is configured to be adhered to the presentation instrument body;
    placing an inhibitor onto the printable film material at a location on the printable film material that will be placed over the magnetic stripe on the blank presentation instrument; and printing on the printable film at least one of a background image, an account number, and an expiration date.

16. A method of real time personalization of a blank card for a card recipient, comprising:

receiving, by a server, a request for a new personalized card for the card recipient from a branch location, the request including an indication of a desired card format for the personalized card and card recipient identification data;

the server processing the request and transmitting a request for data for the blank card to a card management system;

the server receiving data for the blank card from the card management system in response to the request for data; and the server transmitting data to be placed on the blank card in the desired card format to the branch location for personalizing the blank card, wherein the data transmitted by the server to the branch location comprises the card recipient's name, an image to be printed onto the blank card, an account number, an expiration date, a card verification value, and a PIN offset value.

17. The method of claim 16, further comprising the server calculating data for the blank card upon receiving data from the card management system.

18. The method of claim 16, wherein the branch location includes a card printer, and using the card printer to personalize the blank card, the card printer being configured to inhibit the application of personalization to a location on the blank card that could interfere with functionality of the card.

19. A method of real time personalization of a blank card for a card recipient, comprising:

receiving, by a server, a request for a new personalized card for the card recipient from a branch location, the request including an indication of a desired card format for the personalized card and card recipient identification data;

the server processing the request and transmitting a request for data for the blank card to a card management system;

the server receiving data for the blank card from the card management system in response to the request for data;

the server calculating data for the blank card upon receiving data from the card management system, wherein the data calculated by the server varies based on a type of blank card to be personalized for the card recipient; and the server transmitting data to be placed on the blank card in the desired card format to the branch location for personalizing the blank card.

20. A method of real time personalization of a blank card for a card recipient, comprising:

receiving, by a server, a request for a new personalized card for the card recipient from a branch location, the request including an indication of a desired card format for the personalized card and card recipient identification data;

the server processing the request and transmitting a request for data for the blank card to a card management system;

the server receiving data for the blank card from the card management system in response to the request for data; and the server transmitting data to be placed on the blank card in the desired card format to the branch location for personalizing the blank card;

wherein the branch location includes a card printer, and using the card printer to personalize the blank card, the card printer being configured to inhibit the application of personalization to a location on the blank card that could interfere with functionality of the card, and the card printer comprises a reverse film transfer printer, and the card printer includes a multi-color print ribbon with inhibitor panels; the card printer prints inhibitor material from one of the inhibitor panels onto a film material of the reverse film transfer printer at a location on the film material corresponding to a location on the blank card whose functionality would be interfered with by the film material once the film material is transferred onto the blank card.

21. A system configured for real time personalization of a blank card for a card recipient, comprising:

a card printer at one location;

a server at a location remote from the card printer and in communication with the card printer;

a card management system at a location remote from the card printer and in communication with the server;

the server is configured to receive a request for a new personalized card for the card recipient from the one location, the request including an indication of a desired card format for the personalized card to be applied to the blank card and card recipient identification data;

the server is configured to process the request and transmit a request for data to the card management system;

the card management system is configured to send data to the server in response to the request for data; and the server is configured to transmit data to the card printer to permit the card printer to personalize the blank card with the data in the desired card format, wherein the data transmitted by the server to the card printer comprises the card recipient's name, an image to be printed onto the blank card, an account number, an expiration date, a card verification value, and a PIN offset value.

22. The system of claim 21, wherein the server is configured to calculate data for the blank card upon receiving the data from the card management system.

23. The system of claim 21, wherein the card printer is configured to inhibit the application of personalization to a location on the blank card that could interfere with functionality of the card.

24. A system configured for real time personalization of a blank card for a card recipient, comprising:

a card printer at one location;

a server at a location remote from the card printer and in communication with the card printer;

a card management system at a location remote from the card printer and in communication with the server;

the server is configured to receive a request for a new personalized card for the card recipient from the one location, the request including an indication of a desired card format for the personalized card to be applied to the blank card and card recipient identification data;

the server is configured to process the request and transmit a request for data to the card management system;

the card management system is configured to send data to the server in response to the request for data;

the server is configured to calculate data for the blank card upon receiving the data from the card management system, wherein the data calculated by the server varies based on a type of blank card to be personalized for the card recipient; and the server is configured to transmit data to the card printer to permit the card printer to personalize the blank card with the data in the desired card format.

25. A system configured for real time personalization of a blank card for a card recipient, comprising:

a card printer at one location;

a server at a location remote from the card printer and in communication with the card printer;

a card management system at a location remote from the card printer and in communication with the server;

the server is configured to receive a request for a new personalized card for the card recipient from the one location, the request including an indication of a desired card format for the personalized card to be applied to the blank card and card recipient identification data;

the server is configured to process the request and transmit a request for data to the card management system;

the card management system is configured to send data to the server in response to the request for data; and the server is configured to transmit data to the card printer to permit the card printer to personalize the blank card with the data in the desired card format, the card printer is configured to inhibit the application of personalization to a location on the blank card that could interfere with functionality of the card, and the card printer comprises a reverse film transfer printer, and the card printer includes a multi-color print ribbon with inhibitor panels; the card printer is configured to print inhibitor material from one of the inhibitor panels onto a film material of the reverse film transfer printer at a location on the film material corresponding to a location on the blank card whose functionality would be interfered with by the film material once the film material is transferred onto the blank card.

* * * * *